(12) United States Patent
Ciaramitaro

(10) Patent No.: US 11,324,339 B1
(45) Date of Patent: May 10, 2022

(54) PHOTOGRAPHING SEAT ASSEMBLY

(71) Applicant: Frank Ciaramitaro, La Habra, CA (US)

(72) Inventor: Frank Ciaramitaro, La Habra, CA (US)

(*) Notice: Subject to any disclaimer, the term of this patent is extended or adjusted under 35 U.S.C. 154(b) by 0 days.

(21) Appl. No.: 17/082,141

(22) Filed: Oct. 28, 2020

(51) Int. Cl.
*A47D 1/00* (2006.01)
*A47D 15/00* (2006.01)
*A47C 15/00* (2006.01)
*G03B 15/00* (2021.01)
*G09F 23/00* (2006.01)

(52) U.S. Cl.
CPC .......... *A47D 15/006* (2013.01); *A47C 15/004* (2013.01); *A47D 1/00* (2013.01); *G03B 15/00* (2013.01); *G09F 2023/005* (2013.01)

(58) Field of Classification Search
CPC ...... A47D 1/00; A47D 15/006; A47C 15/004; G09F 2023/005; G03B 15/00
USPC ............ 297/148–156, 344.18, 464, 467, 484
See application file for complete search history.

(56) References Cited

U.S. PATENT DOCUMENTS

| | | | |
|---|---|---|---|
| 139,329 A | 5/1873 | Prescott, Jr. | |
| 326,184 A | 9/1885 | White | |
| 527,056 A * | 10/1894 | Gilson | B60N 2/286 297/464 |
| 557,132 A | 3/1896 | La Prease | |
| 1,526,920 A * | 2/1925 | Liptak | A47C 7/002 297/344.18 X |
| 1,922,418 A * | 8/1933 | Conant | A47C 7/425 297/344.18 X |
| 2,646,755 A | 7/1953 | Brunnen | |
| 2,658,553 A * | 11/1953 | Stewart | A47C 15/004 297/243 |
| 3,622,201 A * | 11/1971 | Radig | E04H 15/001 297/184.14 |
| 3,913,976 A * | 10/1975 | Plancher | A47C 3/20 297/344.18 |
| 4,887,106 A * | 12/1989 | Cooper, Jr. | A61C 19/00 396/16 |
| 4,938,603 A * | 7/1990 | Turner | A47D 1/023 297/153 X |
| 5,203,612 A * | 4/1993 | Pokrzywinski | A47D 15/006 297/466 |
| 5,301,999 A | 4/1994 | Thompson | |
| 5,507,550 A * | 4/1996 | Maloney | A47D 1/002 297/153 |
| 5,516,197 A * | 5/1996 | Condos | A47C 3/38 297/344.18 |
| 5,534,963 A | 7/1996 | Adolphi | |
| 6,050,643 A * | 4/2000 | Kain | A47D 1/004 297/344.18 |
| 6,056,353 A * | 5/2000 | Meara | A61G 5/08 297/344.18 |

(Continued)

FOREIGN PATENT DOCUMENTS

DE 102008025258 A1 * 12/2009 .......... A47D 15/006
WO WO2017049371 3/2017

*Primary Examiner* — Rodney B White

(57) ABSTRACT

A photographing seat assembly for taking passport photos of a child includes a seat in which a child can be positioned. A base engaged to a bottom of the seat can be positioned on a substantially horizontal surface so that the seat is supported upon the base. A panel engaged to a back of the seat provides a background for a photograph of the child positioned in the seat.

8 Claims, 5 Drawing Sheets

(56) References Cited

U.S. PATENT DOCUMENTS

| | | | |
|---|---|---|---|
| 6,082,814 A * | 7/2000 | Celestina-Krevh | A47D 1/04 297/153 X |
| 6,089,654 A * | 7/2000 | Burstein | A47D 1/004 297/151 |
| 6,702,384 B1 * | 3/2004 | Brown | A47C 3/38 297/344.18 X |
| 6,733,175 B1 | 5/2004 | Pigg | |
| 6,857,607 B1 * | 2/2005 | Burris | G09F 15/0025 248/164 |
| 6,877,805 B1 * | 4/2005 | Steadman | A47D 1/004 297/344.18 X |
| 7,032,970 B1 * | 4/2006 | Kharat | A47D 1/103 297/344.18 X |
| 7,549,702 B2 * | 6/2009 | Meyers | A47K 3/122 297/344.18 X |
| 7,568,758 B2 * | 8/2009 | Troutman | A47D 1/002 297/148 |
| 8,308,230 B2 * | 11/2012 | Zhong | A47D 1/103 297/148 |
| 8,408,650 B2 * | 4/2013 | Jacobs | A47D 1/004 297/344.18 |
| 8,474,916 B2 * | 7/2013 | Smith | A47C 3/40 297/344.18 X |
| 8,752,903 B2 * | 6/2014 | Ponticelli | A47D 11/02 297/344.18 X |
| 8,794,703 B2 * | 8/2014 | Bateman | A47C 4/028 297/344.18 |
| 9,498,087 B1 * | 11/2016 | Mokhtare | A47D 15/006 |
| D837,537 S | 1/2019 | Huntley | |
| 2003/0102700 A1 * | 6/2003 | Lin | A47C 3/34 297/344.18 X |
| 2004/0041453 A1 * | 3/2004 | Ellis | A47D 1/002 297/344.18 |
| 2004/0256896 A1 * | 12/2004 | Myers | A47C 3/18 297/154 |
| 2013/0097058 A1 * | 4/2013 | Baker | G06Q 30/0641 705/27.1 |
| 2014/0290879 A1 * | 10/2014 | De La Fuente Sanchez | A47C 7/62 160/368.1 |
| 2018/0190165 A1 * | 7/2018 | Schreiber | G09F 3/10 |
| 2018/0279803 A1 * | 10/2018 | Bailliard | B60N 2/265 |
| 2019/0142164 A1 * | 5/2019 | Hsieh | A47C 3/34 297/344.18 |
| 2020/0333688 A1 * | 10/2020 | Collier | G03B 15/00 |
| 2021/0150940 A1 * | 5/2021 | Lin | G03B 15/06 |

* cited by examiner

PHOTOGRAPHING SEAT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to seat assemblies and more particularly pertains to a new seat assembly for taking passport photos of a child.

(2) DESCRIPTION OF RELATED ART INCLUDING INFORMATION DISCLOSED UNDER 37 CFR 1.97 AND 1.98

The prior art relates to seat assemblies, in particular photographing seat assemblies intended for use in photographing a child. Such prior art seat assemblies may comprise an adjustable headrest, chest restraints, and the like. What is lacking in the prior art is a photographing seat that provides a background for a photograph taken of a child in the photographing seat, and in particular a background for a photograph to be used for a passport.

BRIEF SUMMARY OF THE INVENTION

An embodiment of the disclosure meets the needs presented above by generally comprising a seat, which is configured to position a child. A base is engaged to a bottom of the seat. The base is configured to be positioned on a substantially horizontal surface so that the seat is supported upon the base. A panel is engaged to a back of the seat and is configured for provide a background for a photograph of the child positioned in the seat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
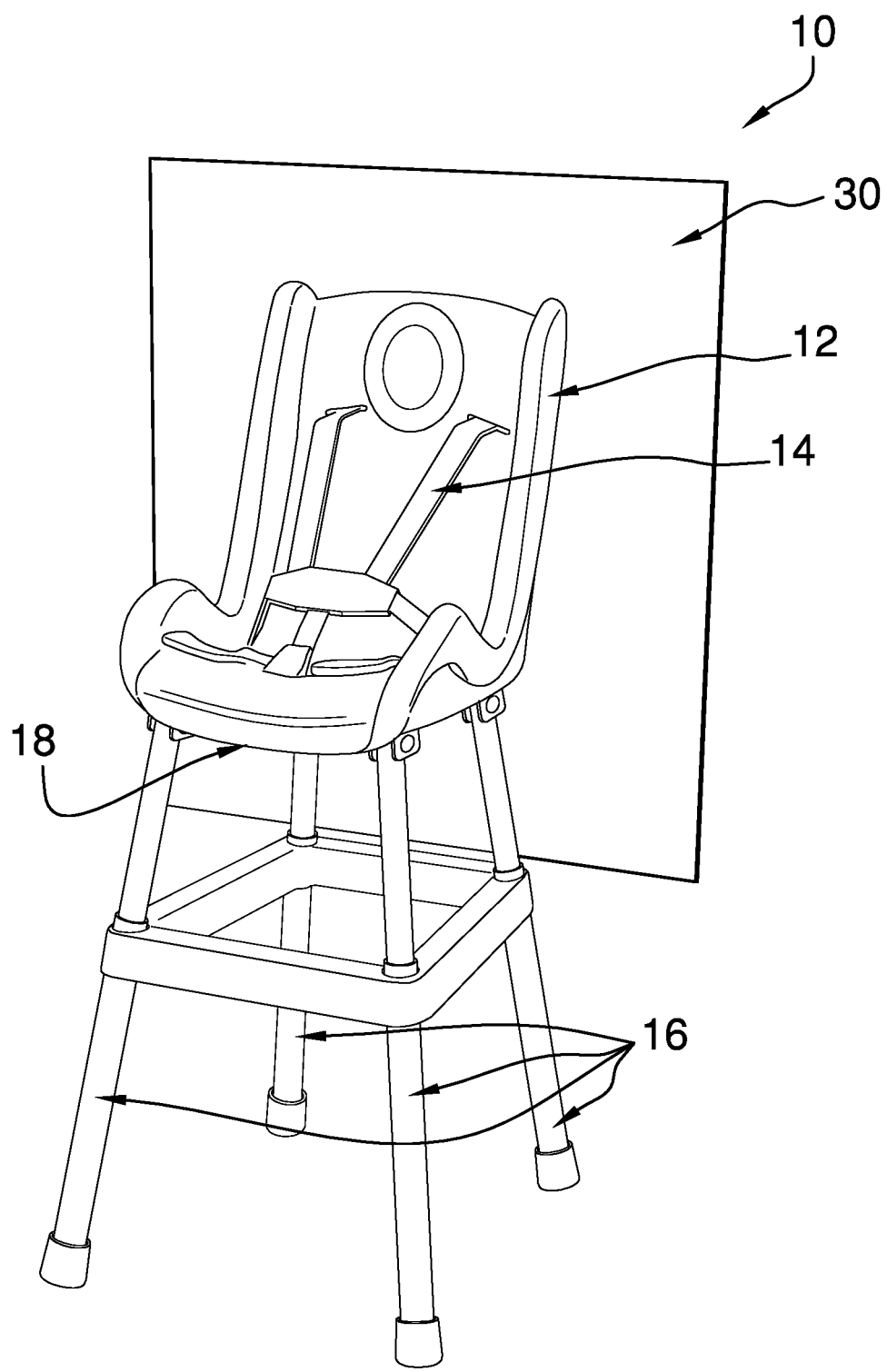
FIG. 1 is an isometric perspective view of a photographing seat assembly according to an embodiment of the disclosure.

With reference now to the drawings, and in particular to FIGS. 1 through 5 thereof, a new seat assembly embodying the principles and concepts of an embodiment of the disclosure and generally designated by the reference numeral 10 will be described.

As best illustrated in FIGS. 1 through 5, the photographing seat assembly 10 generally comprises a seat 12, which is configured to position a child. A harness 14 is engaged to the seat 12 and is configured to be positioned around the child to retain the child in the seat 12. A base 16 is engaged to a bottom 18 of the seat 12. The base 16 is configured to be positioned on a substantially horizontal surface so that the seat 12 is supported upon the base 16.

The base 16 comprises a pair of front legs 20 and a pair of rear legs 22. The front legs 20 and the rear legs 22 are hingedly engaged to the seat 12. Each rear leg 22 comprises an upper section 24 that is selectively extensible from a lower section 26 so that the seat 12 is tiltable relative to the base 16. The base 16 also may comprise a plurality of beams 28. Respective beams 28 are engaged to and extend between the pair of front legs 20 and the pair of rear legs 22. A respective beam 28 is engaged to and extends between the rear legs 22. A respective beam 28 is engaged to and extends between the front legs 20. The plurality of beams 28 thus is positioned to stabilize the front legs 20 and the rear legs 22.

Figure 2:
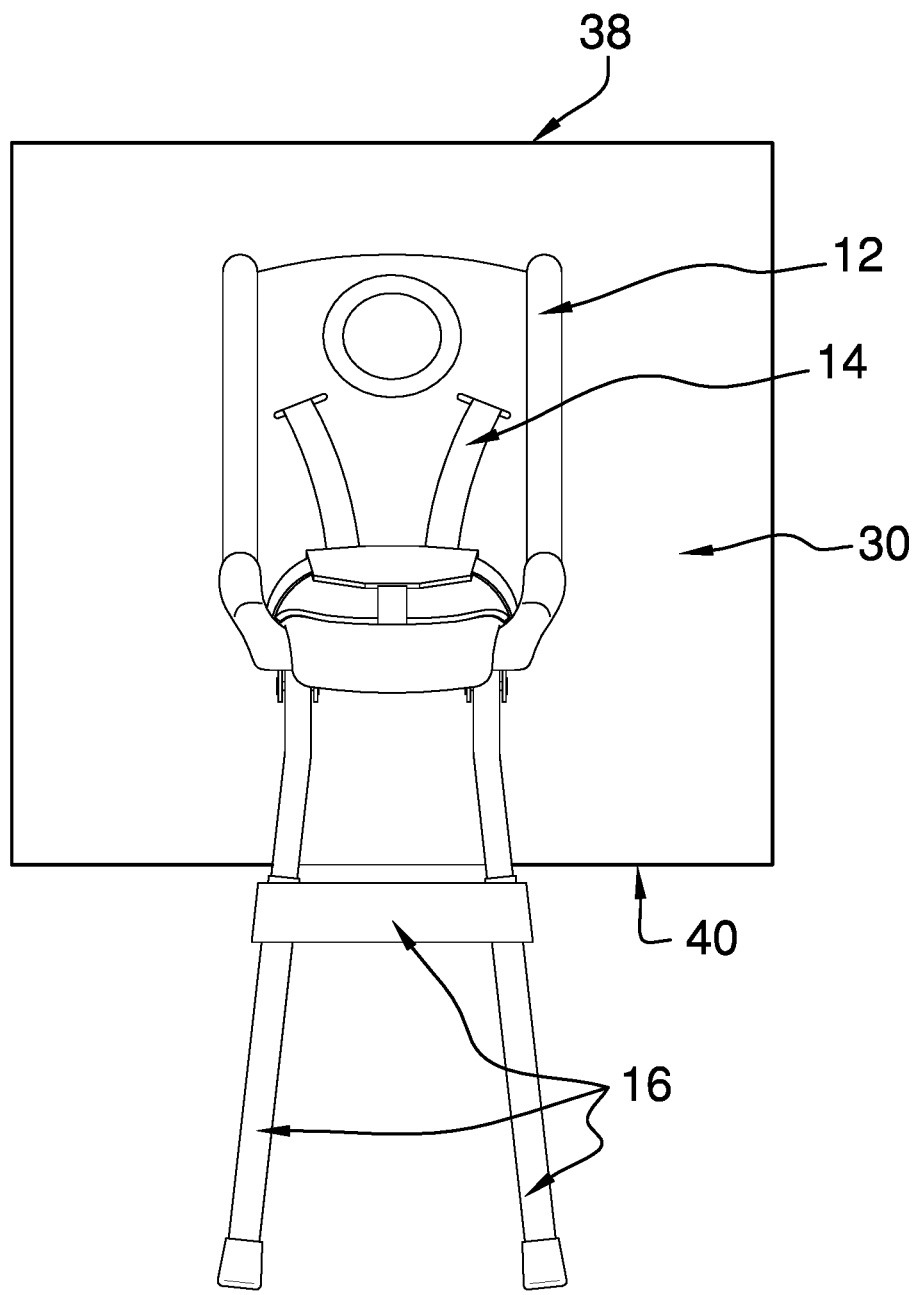
FIG. 2 is a front view of an embodiment of the disclosure.
Figure 3:
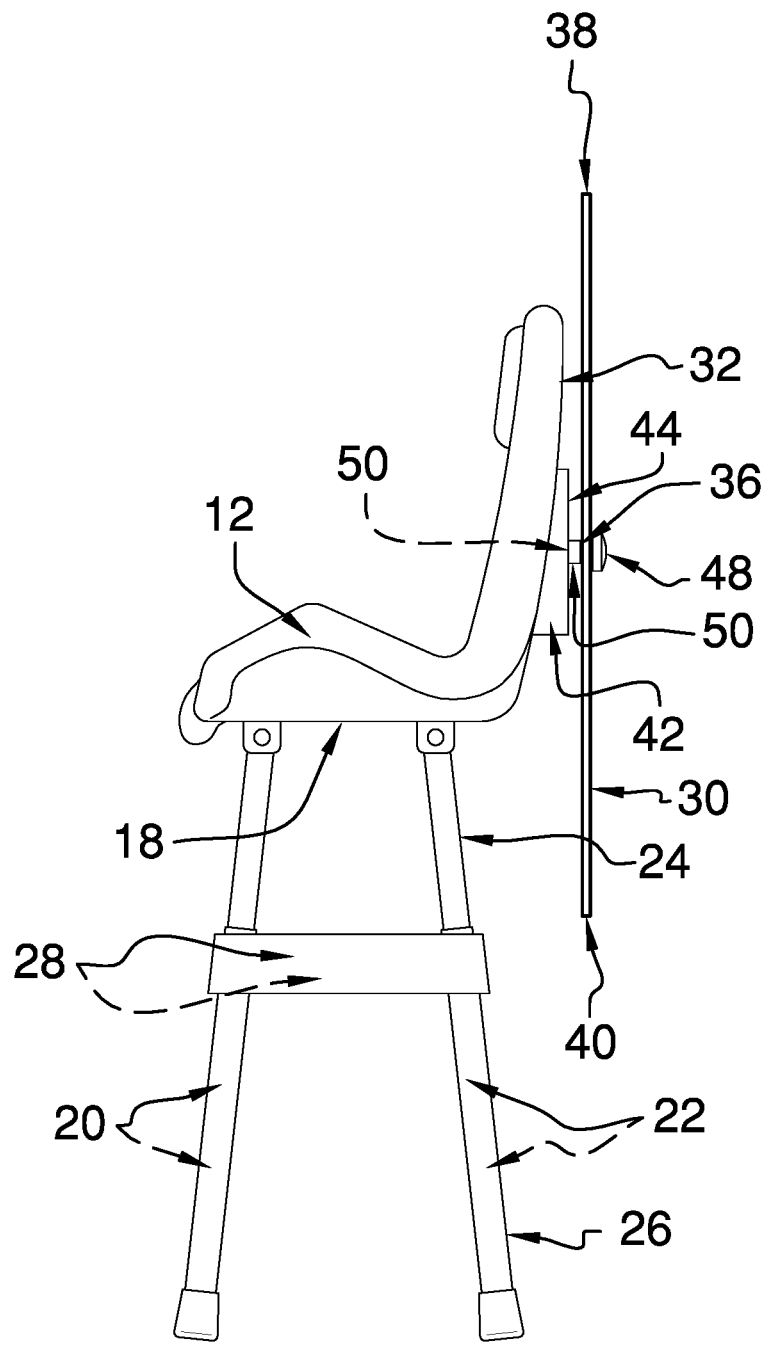
FIG. 3 is a side view of an embodiment of the disclosure.
Figure 4:
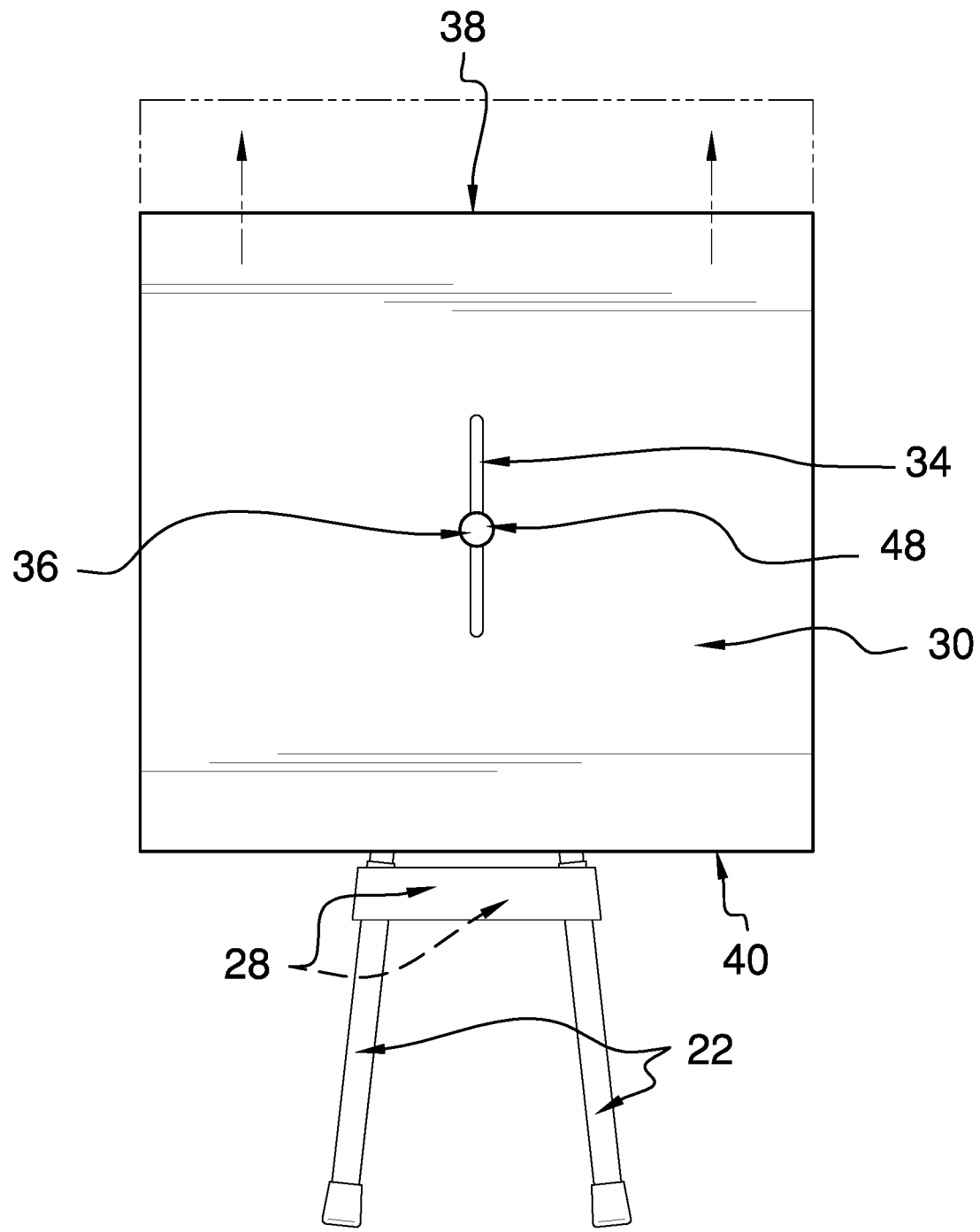
FIG. 4 is a rear view of an embodiment of the disclosure.
Figure 5:
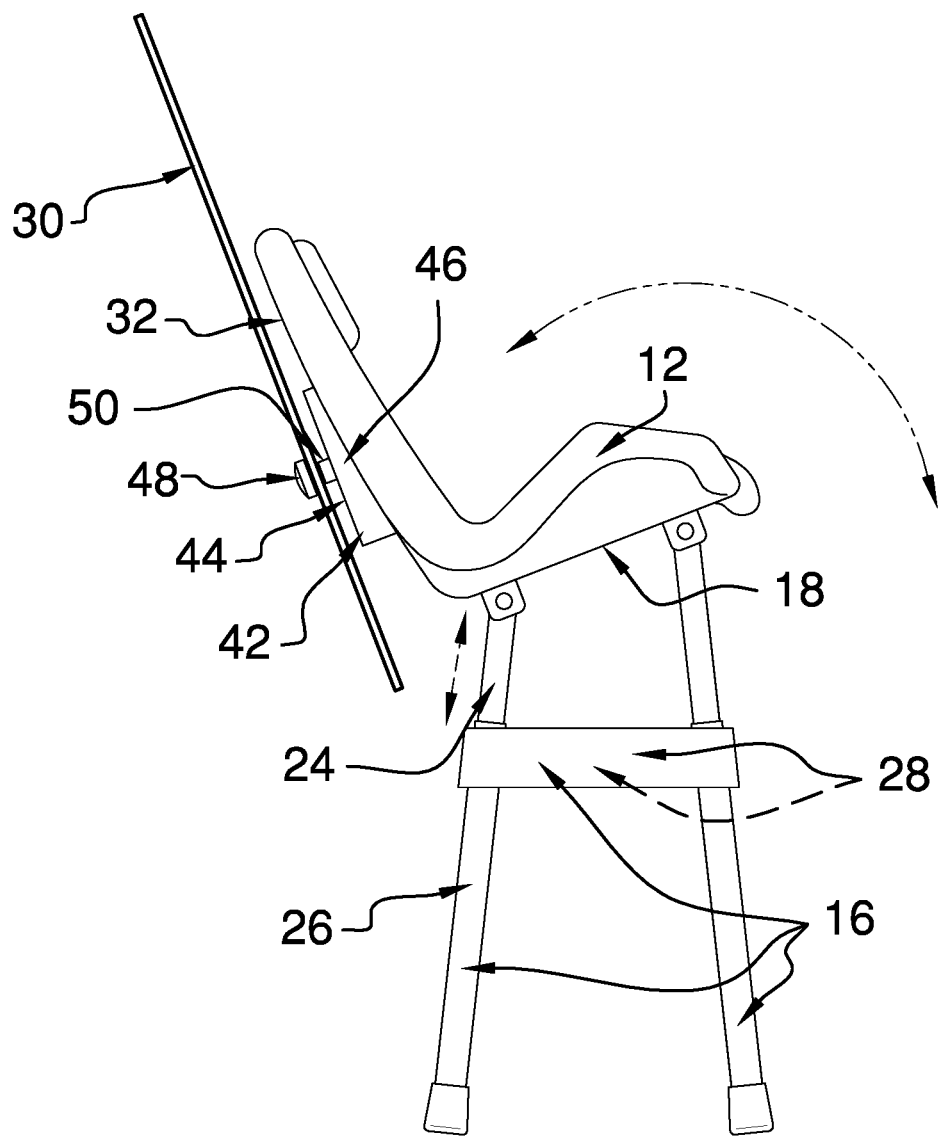
FIG. 5 is a detail view of an embodiment of the disclosure.

A panel 30 is engaged to a back 32 of the seat 12 and is configured for provide a background for a photograph of the child positioned in the seat 12. The panel 30 may be substantially rectangularly shaped, such as squarely shaped, as shown in FIG. 2. The present invention anticipates the panel 30 being of other shapes, such as, but not limited to, round, oval, and the like. The panel 30 may be white so that the panel 30 is configured to provide a background for a passport photo. The present invention also anticipates the panel 30 being of other colors, such as, but not limited to, blue, pink, and the like. With the seat 12 being tiltable relative to the base 16, a photographer can select an angle of the seat 12 and the child that is optimal for a photograph.

The panel 30 has a slot 34 positioned therein. The slot 34 extends bidirectionally from a midpoint 36 of the panel 30 toward an upper end 38 and a lower end 40 thereof. A block 42 is engaged to and extends from the back 32 of the seat 12 so that an outer face 44 of the block 42 is substantially perpendicular to the horizontal surface. The block 42 has a hole 46 extending thereinto from the outer face 44. The hole 46 is threaded.

A thumbscrew 48 is positioned through the slot 34 and is selectively threadedly insertable into the hole 46. The panel 30 thus is selectively positionable relative to the seat 12 and is removably engaged to the block 42. A tube 50 is positioned around the thumbscrew 48. The tube 50 is positioned between the panel 30 and the block 42 so that the tube 50 is positioned to facilitate positioning of the panel 30 relative to the block 42. The panel 30 being adjustably positionable relative to the seat 12 allows the photographer to adjust the panel 30 so that the child is centered therein. The tube 50 also is positioned to facilitate tightening of the thumbscrew 48 to secure the panel 30 to the block 42.

In use, the child is positioned in the seat 12 and fastened thereto using the harness 14. A position of the panel 30 relative to the seat 12 and an angle of the seat 12 are adjusted to obtain optimal positioning for photographing the child. With the panel 30 being white, the photographs obtained are suitable for use in passports.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A photographing seat assembly comprising:
   a seat configured for positioning a child;
   a base engaged to a bottom of the seat and being configured for positioning on a substantially horizontal surface, such that the seat is supported upon the base, wherein the base comprises a pair of front legs a pair of rear legs;
   a panel engaged to a back of the seat, wherein the panel is configured for providing a background for a photograph of the child positioned in the seat; and
   a plurality of beams, respective beams being engaged to and extending between the pair of front legs and the pair of rear legs, a respective beam being engaged to and extending between the rear legs, a respective beam being engaged to and extending between the front legs, such that the plurality of beams is positioned for stabilizing the front legs and the rear legs.

2. The photographing seat of claim 1, further including a harness engaged to the seat and being configured for positioning around the child for retaining the child in the seat.

3. The photographing seat of claim 1, wherein:
   the front legs are hingedly engaged to the seat; and
   the rear legs are hingedly engaged to the seat, each rear leg comprises an upper section selectively extensible from a lower section, such that the seat is tiltable relative to the base.

4. The photographing seat of claim 1, wherein the panel is substantially rectangularly shaped.

5. The photographing seat of claim 1, wherein the panel is white, wherein the panel is configured for providing a background for a passport photo.

6. A photographing seat assembly comprising:
   a seat configured for positioning a child;
   a base engaged to a bottom of the seat and being configured for positioning on a substantially horizontal surface, such that the seat is supported upon the base;
   a panel engaged to a back of the seat, wherein the panel is configured for providing a background for a photograph of the child positioned in the seat;
   the panel having a slot positioned therein, the slot extending bidirectionally from a midpoint of the panel toward an upper end and a lower bottom thereof;
   a block engaged to and extending from the back of the seat, such that an outer face of the block is substantially perpendicular to the horizontal surface, the block having a hole extending thereinto from the outer face, the hole being threaded; and
   a thumbscrew positioned through the slot and selectively threadedly insertable into the hole, such that the panel is selectively positionable relative to the seat, and such that the panel is removably engaged to the block.

7. The photographing seat of claim 6, further including a tube positioned around the thumbscrew, the tube being positioned between the panel and the block, such that the tube is positioned for facilitating positioning of the panel relative to the block, such that the tube is positioned to facilitate tightening of the thumbscrew for securing the panel to the block.

8. A photographing seat assembly comprising:
   a seat configured for positioning a child;
   a harness engaged to the seat and being configured for positioning around the child for retaining the child in the seat;
   a base engaged to a bottom of the seat and being configured for positioning on a substantially horizontal surface, such that the seat is supported upon the base, the base comprising:
   a pair of front legs, the front legs being hingedly engaged to the seat,
   a pair of rear legs, the rear legs being hingedly engaged to the seat, each rear leg comprising an upper section selectively extensible from a lower section, such that the seat is tiltable relative to the base, and
   a plurality of beams, respective beams being engaged to and extending between the pair of front legs and the pair of rear legs, a respective beam being engaged to and extending between the rear legs, a respective beam being engaged to and extending between the front legs, such that the plurality of beams is positioned for stabilizing the front legs and the rear legs;
   a panel engaged to a back of the seat, wherein the panel is configured for providing a background for a photograph of the child positioned in the seat, the panel being substantially rectangularly shaped, the panel being white, wherein the panel is configured for providing a background for a passport photo, the panel having a slot positioned therein, the slot extending bidirectionally from a midpoint of the panel toward an upper end and a lower bottom thereof;

a block engaged to and extending from the back of the seat, such that an outer face of the block is substantially perpendicular to the horizontal surface, the block having a hole extending thereinto from the outer face, the hole being threaded;

a thumbscrew positioned through the slot and selectively threadedly insertable into the hole, such that the panel is selectively positionable relative to the seat, and such that the panel is removably engaged to the block; and a tube positioned around the thumbscrew, the tube being positioned between the panel and the block, such that the tube is positioned for facilitating positioning of the panel relative to the block, such that the tube is positioned to facilitate tightening of the thumbscrew for securing the panel to the block.

* * * * *